INVENTOR
Yehuda L. Sandler

United States Patent Office
3,671,323
Patented June 20, 1972

3,671,323
HYDROPHOBIC LAYERS FOR GAS DIFFUSION
ELECTRODES
Yehuda L. Sandler, Pittsburgh, Pa., assignor to Westinghouse Electric Corporation, Pittsburgh, Pa.
Filed Jan. 12, 1970, Ser. No. 2,042
Int. Cl. H01m 27/04, 13/02
U.S. Cl. 136—86 D
10 Claims

ABSTRACT OF THE DISCLOSURE

A gas diffusion electrode having a gas entrance side and an electrolyte contacting side for use with a liquid electrolyte and a gas in an electrochemical cell, comprises a coherent porous body, containing an electrical conductor and a hydrophobic outer layer on the gas entrance side, the hydrophobic outer layer comprising cloth material impregnated with wet proofing polymer.

BACKGROUND OF THE INVENTION

This invention relates to electrochemical cells, such as fuel cells or hybrid metal-gas cells and, more particularly, it pertains to electrodes for such cells which have new and improved hydrophobic layers of cloth impregnated with a wet proofing polymeric agent, which prevent electrolyte penetration through the electrode body.

Fuel cells are electrochemical devices which convert the chemical energy in a fuel directly into electrical energy by the oxidation of fuel supplied to the cell. The fuel cell is composed of two gas diffusion electrodes adjacent to and in contact with an electrolyte, with means for supplying a fuel to one electrode and an oxidant to the other electrode. In a gas diffusion electrode, the gas penetrates by diffusion to a three-phase zone which is a narrow electrochemically active zone where the gas, liquid electrolyte, and the solid particles of the electrode meet. A catalyst is usually used to accelerate the electrode reaction in gas electrodes. Ideally, the catalyst is most effective when it is located at the active interface where the electrolyte, electrode and gas meet. Preferably, that interface is close to the gas phase so that there is a short diffusion path for the gas.

A gas diffusion electrode is also used in hybrid batteries. In these, the diffusion electrode is fed with air or oxygen and is generally paired with a metal electrode. In operation, the chemical energy of oxidation of the fuel or of the metal is converted into electrical energy.

A common weakness of gas diffusion electrodes is the occurrence of "sweating," which is the formation of tiny drops of electrolyte on the gas side of the electrode due to penetration of the electrolyte. A variety of methods have been tried to attempt to avoid penetration of the electrode by the electrolyte.

One method is taught by Sandler and Durigon in U.S. Ser. No. 776,636, filed on Nov. 18, 1968, now abandoned and assigned to the assignee of this invention. There, a large percentage of a hydrophobic resinous binder was used in the gas layer of the electrode, and any electrolyte that seeped through the structure was collected in a trap and returned to the system.

In most prior art structures, inhomogeneities and defective spots that may be formed during production of the electrodes or develop during their prolonged use may cause local penetration of the electrode by the electrolyte and partial failure of the electrochemical cell output. As the electrode ages, drop of electrolyte may tend to penetrate due to the formation of cracks in the electrode or due to changes in interfacial tension by accumulation of impurities.

The prior art has recognized and sought to alleviate the problem of electrolyte penetration through the electrode. Fluorocarbon polymers used to prevent this penetration as binders to fill the electrode pores and as pure polymeric sheets in dual structure electrodes are described in U.S. 3,385,780. Fluorinated polymer coated on glass cloth substrates as a barrier sheet in liquid-liquid type fuel cells for the purpose of preventing liquid oxidant from reacting with catalyst in the electrode are described in U.S. 3,382,103.

It has now been discovered that improved and simplified methods of wet proofing gas diffusion electrodes in gas-liquid type electrochemical cells can be obtained by incorporating a separate hydrophobic barrier layer of inexpensive cloth, impregnated with a wet proofing polymer such as a colloid fluorocarbon, onto an already partially wet proofed coherent, porous electrode body, where the hydrophobic barrier layer is next to the gas zone and prevents occasional drops of electrolyte from contaminating the device on the gas side.

SUMMARY OF THE INVENTION

Accordingly, it is an object of this invention to provide an improved electrochemical cell with an improved gas diffusion electrode having efficient distribution of catalyst, optimized gas diffusion rates and superior wet proofing properties, whereby electrolyte penetration to the gas zone is eliminated.

It is another object of this invention to provide an improved process of preparing wet proofed gas diffusion electrodes.

Briefly, the above objects are accomplished in accordance with the present invention, by pressing a hydrophobic barrier layer of impregnated wet proofed fabric to a partially wet proofed gas diffusion electrode.

The electrode in its preferred form contains a backing layer, a catalyzed gas entrance layer, a separate hydrophobic layer, and a porous electrical conductor grid, the backing and catalyzed gas entrance layers being bonded together and to opposite sides of the porous electrical conductor grid. The backing and catalyzed gas entrance layers each contain particles of electrically conductive material inert to the electrolyte, such as carbon, boron carbide, other carbonaceous materials inert to the electrolyte, or finely divided metals, and a resinous binder inert to the electrolyte, such as polytetrafluoroethylene or polysulfone resin. The gas entrance layer includes a catalyst, such as platinum, gold or silver. The gas entrance layer, preferably will contain sufficient binder, about 10 to 50 weight percent, to provide partial wet proofing. A polytetrafluoroethylene impregnated cloth hydrophobic layer may then be pressed to the catalyzed, partially wet proofed, gas entrance electrode layer. This results in a gas diffusion electrode providing improved periods of dry operation.

BRIEF DESCRIPTION OF THE DRAWINGS

For a better understanding of the nature and objects of this invention, the reference is made to the drawings, in which.

DESCRIPTION OF THE PREFERRED EMBODIMENT

Figure 1:
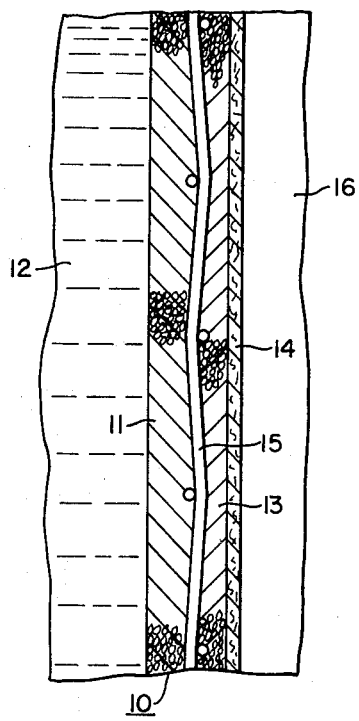
FIG. 1 is a schematic view through one embodiment of a gas diffusion electrode showing the hydrophobic wet proofed barrier layer.

FIG. 1 schematically illustrates one embodiment of an electrode 10, comprising a coherent porous body having a gas-entrance side and an electrolyte-contacting side, with three layers including a backing layer 11 next to electrolyte 12, gas entrance layer 13 and a wet proofed hydrophobic barrier layer 14. The layers 11 and 13 are shown bonded together and on opposite sides of electrical conductor 15.

The backing layer 11 is composed of particles of a conducting material, preferably a carbonaceous material selected from a group consisting of carbon, graphite, boron carbide, and mixtures thereof. This layer may also contain or be composed entirely of a conducting material of finely divided metals such as platinum and silver which may be in the form of a particulate black. In addition, the layer 11 includes a binder inert to the electrolyte, for example, polysulfone resin, polyethylene latex, polypropylene latex, or a fluorocarbon polymer such as polytetrafluoroethylene, that binds the particles of conducting material together in a porous manner. When carbon is used as the conducting material, the particles have a surface area of from about 5 to 500 square meters per gram. The amount of binder may vary from about 5 to 50 weight percent of the total composition of layer 11.

The gas entrance layer 13 of FIG. 1 is composed of particles of a conducting material similar to that of the layer 11 as well as of a binder similar to that used in the layer 11. However, inasmuch as the layer 13, in the preferred structure of FIG. 1, is a more hydrophobic member, to help prevent the passage of electrolyte to the gas side 16 and allow a deeper penetration of the gas into the electrode, a substantially greater percentage of a hydrophobic binder that is inert to the electrolyte should be used. For that purpose the amount of binder in the layer 13 can vary from about 10 to about 50 weight percent of the total composition of the layer 13 with a preferred range of from about 20 to 50 weight percent. In addition, the layer 13 includes a suitable catalyst which would contain at least one of the metals of a group consisting of the platinum group metals (Pt, Ir, Ru, Rh, Pd), gold and silver. Other catalysts may be used. Their choice depends on the reaction proceeding at the electrode. Thus for the oxygen electrode, members of the transition elements or mixtures thereof, or silver, gold or their mixtures with oxides, are examples of efficient catalysts. Inexpensive catalysts such as cobalt oxide, manganese oxide or mixed oxides of the spinel structure may be added over the entire electrode structure. Of course, if platinum or silver is used as conducting material instead of carbon, no additional catalyst will be needed.

In addition, a filler may be added to the electrode body to improve the mechanical strength or the diffusion characteristic of the electrode. The filler may be composed of, for example, fibrous potassium titanate in an amount up to about 25 weight percent of the total electrode composition.

The porous metal electrical conductor 15 may be a wire mesh member, an expanded metal member, a perforated metal sheet, or a compressed metal wool member. The conductor is preferably composed of nickel that is either unplated, or plated with a noble metal when used as an air electrode.

The material that constitutes the electrode body is applied so as to completely cover the electrical conductor. The backing layer although adding strength to the structure, may be eliminated if space considerations are important. A typical thickness of the electrode may vary from about 20 to 50 mils, the hydrophobic barrier layer generally being about 12 mils thick.

The active mass of the gas entrance layer 13 is generally composed of three ingredients containing from about 50 to 80 weight percent of carbon black (where carbon is used) and from about 20 to 50 weight percent of binder, based on the mixture of carbon and hydrophobic binder. A catalytic material is then generally added to the mixture to give active catalyst in an amount varying about 0.1 to 10 milligrams per square cm. of geometric electrode area.

The hydrophobic barrier layer 14 shown in FIG. 1 is a separate layer of woven fabric, impregnated generally with a fluorocarbon, chloro-fluorocarbon or hydrophobic hydrocarbon wet proofing polymer or copolymer generally in particulate form. This provides a gas porous wet proof layer next to the gas entrance layer 13 which contains the catalyst and is already partially wetproofed. The hydrophobic layer 14 is in direct contact with the gas zone or chamber 16 of the electrochemical cell.

The hydrophobic barrier layer has been incorporated onto the electrode body specifically for gas-liquid systems. It has been found that better results attend placing the barrier layer on the gas side of the gas diffusion electrode so that liquid electrolyte can penetrate to the three phase reaction zone within the electrode body. My configuration allows diffusion of electrolyte to the catalyst and contact of liquid electrolyte with gas while completely preventing electrolyte penetration to the gas side.

Fabrics that can be used in the hydrophobic barrier layer include those made of cotton, carbon, polypropylene, nylon and others that are not harmful by the electrolyte. The fabric should be closely woven and have practically no open projected area. The wet proofing hydrophobic polymers include polymers selected from the group consisting of polystyrene, polyethylene, polypropylene, fluorinated hydrocarbons, chloro-fluorinated hydrocarbons and their copolymers and mixtures. Examples of fluorinated hydrocarbons would include polytetrafluoroethylene, polytrifluoroethylene and vinylidene fluoride. Examples of chloro-fluorinated hydrocarbons would include polydichlorodifluoroethylene and polytrifluorochloroethylene. Of the polyhalogenated hydrocarbons, polytetrafluoroethylene was found to be particularly useful as a hydrophobic polymer. These wet proofing polymers should be impregnated in the range of about 30 to 500 mg. of polymers or copolymers per cubic cm. of fabric for useful hydrophobic barrier layers with a preferred range of between 100 to 400 mg. per cubic cm. of fabric. Below 30 mg./cu. cm. of polymer the fabric is only wetted and the barrier layer will not demonstrate adequate hydrophobic characteristics. Above 500 mg./cu. cm. of polymer gas porosity will be hampered particularly if very fine particle dispersions are used. The wet proofing polymer will generally be impregnated into the cloth in a fine (about .05 to 10 micron) particle dispersion. Dispersions of particles below about .05 micron will harm gas porosity of the barrier layer especially at large impregnation loadings and dispersions of particles above 10 microns are difficult to achieve.

Generally, the fabric cloth is impregnated by spraying with the wet proof polymeric agent, heated to evaporate the water and washed with acetone, methanol or dimethylacetamide to remove the emulsifier. Other techniques such as painting the wet proof agent onto the cloth over a vacuum funnel may be used to improve impregnation. The impregnated wet proof cloth is then pressed onto the gas side of the aforedescribed composite.

Generally the ingredients for each layer 11 and 13 are thoroughly mixed with the suspension of a hydrophobic resin and sufficient water to produce a stiff paste. Each layer 11 and 13 is then applied separately to the corresponding side of the electrical conductor 15. It was found that the catalyst on the gas entrance layer 13 is better utilized by mixing carbon and polymer first, and adding the catalyst subsequently.

The electrode is placed between porous sheets to absorb water and then compressed by pressing or rolling to remove excess water and uniformly distribute the particulate paste material on the conductor. After additional drying in air the electrode 10 is gradually heated to a temperature ranging from about 60° C. 350° C. The electrode is then hot pressed between metal foil sheets at about the same temperature and under a load of about 100 pounds per square centimeter of electrode area to cause the resin to bind the particles together.

The fabric, impregnated with between about 30 to 500 mg./cu. cm. of particulate hydrophobic polymer of about .05 to 10 microns generally in an aqueous dispersion. This forms the barrier sheet layer 14, which is preferably pressed at about 100 pounds per square centimeter at about 100° C. to bond the polymer particles to each other and the fabric. Temperatures as high as 400° C. can be used but a correspondingly low pressure must then be used in compacting or the barrier sheet layer will become so dense as to restrict gas flow through it. Also at much higher pressures, room temperature may be used in this prepressing step.

The barrier layer 14 is then bonded onto the gas entrance layer at about 100 pounds per square centimeter and about 100° C. to form gas diffusion electrode 10.

Figure 2:
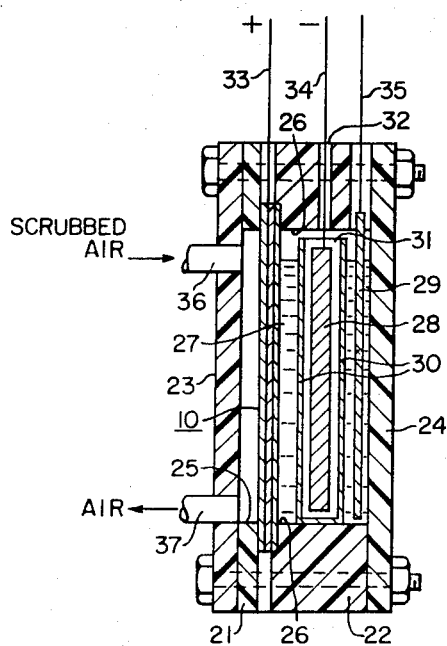
FIG. 2 is a schematic view showing a gas diffusion electrode mounted in hybrid battery.

In actual use as an air electrode in a metal-air battery, the electrode 10 mty be employed as shown in FIG. 2. For that purpose the electrode 10 is mounted between a pair of frame members 21 and 22 are which are disposed between end plates 23 and 24. An air chamber 25 is provided between the end plate 23 and the electrode 10. Likewise, a chamber 26 is provided between the electrode 10 and the end plate 24, which chamber is filled with electrolyte 27 such as NaOH or a 30 weight percent solution of KOH. An electrode 28 and acharging electrode 29 (for recharging the battery) are disposed in the chamber 26 and with the electrolyte. The electrode 28 is composed of an oxidizable metal such as iron, cadmium or zinc. The charging electrode 29 is composed of an inert metal such as nickel. The electrode 28 is encased in an envelope 30 having an open top 31. The envelope 30 serves as a separator consisting of a sheet of cellophane sandwiched between sheets of fibrous polypropylene. The oxygen electrode is positive with respect to the metal electrode. When charging, the charging electrode is positive with respect to the metal electrode.

A vent 32 in the frame member 22 is provided to permit the escape of gases from the electrodes 28 and 29 when charging. Wire leads 33, 34 and 35 extend from the electrodes 10, 28 and 29, respectively. An air inlet 36 and an air outlet 37 are provided in the end plate 23.

Figure 3:
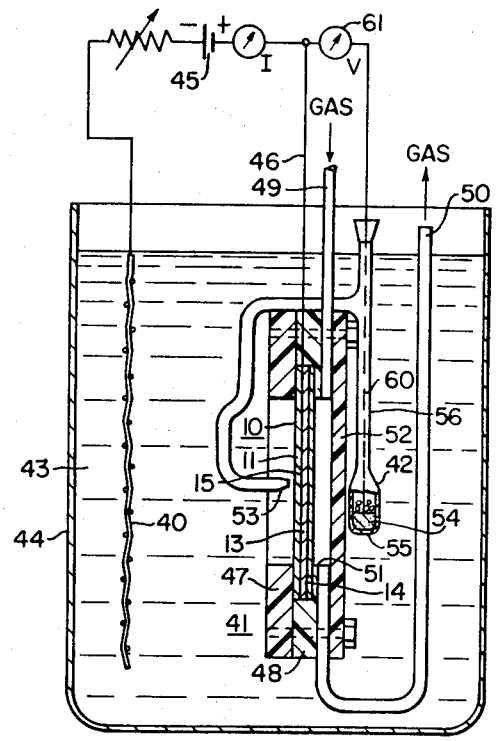
FIG. 3 shows an electrode testing device.

The electrode 10 was tested against an inert counterelectrode 40 in a driven circuit, such as shown in FIG. 3, for which purpose it was placed in an electrode holder 41, in conjunction with a reference electrode 42.

As shown in FIG. 3, the assembly of the electrode holder 41 and the electrode 10 is immersed in an electrolyte 43, such as aqueous KOH, contained in a container 44. A counter electrode 40, composed of a metal mesh such as platinum or nickel, is likewise immersed in the electrolyte 43. The cell including the electrodes 10 and 40 in the electrolyte 43 is driven by a 12 volt battery 45 for testing with the electrode 10 connected to the circuit by a lead wire 46, which extends between the interfaces of the frame member 47 and the portions 48, and which is connected to the upper end of the grid conductor 15.

The electrode holder 41 is provided with an inlet tube 49 and an outlet tube 50 which communicate with the portion of the opening 51 between the plate portion 52 and the electrode 10, whereby the active gas such as oxygen is in contact with the catalyzed gas entrance layer 13 and the barrier sheet layer 14.

The reference electrode 42 is used in conjunction with a Luggin capillary having an opening 53 which is located two mm. from the surface of the electrode 10, in order to measure the potential of the electrode against a point in the electrolyte located as closely as possible to the electrode 10. The electrode 42 includes a mercury/mercury oxide mixture 54 located in a glass bulb 55 that communicates via an inverted U-shaped glass tube 56 with the Luggin capillary opening 53 on the electrolyte side of the electrode 10. The tube 56 is filled with electrolyte 43. The tube 56 is U-shaped to facilitate attachment of the electrode 42 and the electrode holder 41. A platinum wire 60 leads from the Hg/HgO mixture 54 to one side of a high impedance, voltmeter 61, the other side of which is connected to the electrode 10. When air is used as an active gas and the electrolyte is alkaline (KOH), the air before entering the device is preferably scrubbed by passit through an alkaline solid absorbent or an alkaline solution. This removes the carbon dioxide from the air which otherwise would react with the electrolyte and tends to destroy the structure of the electrode. Other impurities like $SO_2$ are simultaneously removed.

The following examples illustrate the practice of the invention:

Example I

A circular air diffusion electrode was prepared having a total area of 20 square centimeters and a total thickness of about 24 mils. The backing layer was made from 175 mg. of conducting carbon black and an aqueous emulsion containing 25 mg. of finely divided polytetrafluoroethylene (sold under the trade name Teflon 30 TFE Emulsion by E. I. du Pont) which were mixed with sufficient water to form a stiff paste. The mixture (containing 12.5 weight percent polytetrafluoroethylene as a binder, based on the weight of binder plus conducting material) was spread over one side of an expanded nickel mesh that was silver plated. The mesh was about 5 mils thick having openings of about 5 mm.$^2$. Excess moisture was removed by placing a sheet of porous polyvinyl chloride (PVC) immediately under the nickel mesh and a sheet of filter paper under the sheet of PVC.

The subassembly of the mesh and backing layer was then inverted. The sheets of PVC and filter were removed from the mesh and were placed against the backing layer on the side opposite of the mesh. A catalyzed gas entrance layer was then applied to the other side of the mesh. The gas entrance layer was composed of a mixture of 80 mg. of a conducting carbon black and an aqueous emulsion of the aforedescribed TFE 30 containing 35 mg. of finely divided polytetrafluoroethylene. To this mixture 32 mg. of silver nitrate was added (to give about 1 mg. of metallic silver per square cm. of electrode area). Sufficient water was added to the mixture (containing 33 weight percent polytetrafluoroethylene based on the weight of binder plus conducting material) to produce a stiff paste. The mixture was applied on the mesh and excess moisture was absorbed by additional sheets of PVC and filter paper.

The electrode, consisting of the backing layer and the catalyzed gas entrance layer, with sheets of PVC and filter paper on opposite outer sides was then compacted by passing it through a pair of rollers in various directions. As a result, layers were evenly distributed, and excess water was pressed out. Subsequently, the electrode was slowly heated to about 350° C. in a furnace and hot pressed under a 2000 lb. load at about 280° C.

A closely woven nylon fabric weighing 5.5 ounces per square yard having a thickness of 11.4 mils, a warp of 101 threads/in. and a filling of 65 threads/in. was used in the hydrophobic layer. A 20 square cm. piece of the fabric was soaked in a solution of 2 weight percent of a polymer of vinylidene fluoride (sold under the trade name Kynar and Pennsalt Chemicals) in dimethyl acetamide solvent and then washed in water. It was then soaked in aqueous emulsion of a copolymer of hexafluoropropylene and tetrafluoroethylene (sold by E. I. du Pont under the trade name Teflon 120 FEP Emulsion, containing 55.4% solids), dried on a hotplate, washed in acetone several times and allowed to air dry to evaporate the solvent. After washing and drying, about 6.9 mg. of wet proofing polymer was taken up per sq. cm. of cloth surface area (230 mg./cu. cm. cloth). The impregnated fabric was prepressed at 2000 lb. load at 100° C. and was then pressed onto the catalyzed gas entrance layer of the electrode at the same temperature and load to give a structure similar to that shown in FIG. 1 of the drawings.

The electrode was tested in the "driven" cell shown in FIG. 3 of the drawings containing 27 weight percent KOH solution as electrolyte. The catalyzed gas layer faced the gas side of the cell and the backing layer faced the electrolyte as shown in FIG. 3. It was operated in scrubbed air ($CO_2$ free) at 100 ma./sq. cm. current density and at 25° C. gave an average voltage of —0.15 as measured against an Hg/HgO reference electrode. The gas diffusion electrode with the hydrophobic barrier layer operated for 12 days in the test cell, without a drop of the electrolyte penetrating to the gas side of the electrode. Electrodes having similar binder content in the electrode body but not containing the hydrophobic barrier sheet layer of this invention showed some "sweating" on the gas side after 2 or 3 days.

Example II

A circular gas diffusion electrode was prepared having a total area of 20 square centimeters and a thickness of about 20 mils. The porous electrode body was made from 800 mg. platinum black and an aqueous emulsion containing 70 mg. of finely divided polytetrafluoroethylene (sold under the trade name Teflon 30 TFE Emulsion by E. I. du Pont) which were mixed with sufficient water to form a stiff paste. The mixture (containing about 9 weight percent polytetrafluoroethylene, based on the weight of binder plus conducting material) was spread over a gold plated 60 x 60 nickel mesh. Sheets of polyvinyl chloride and filter paper were placed on opposite sides of the electrode which was then compacted by passing it through a pair of rollers in various directions. Subsequently the electrode was slowly heated to about 350° C. in a furnace and hot pressed under a 2000 lb. load at about 280° C.

A closely woven nylon fabric weighing 5.5 ounces per square yard having a thickness of 11.4 mils, a warp of 101 threads/in. and a filling of 65 threads/in. was used in the hydrophobic layer. A 20 square cm. piece of the fabric was impregnated with a solution of an aqueous emulsion of a copolymer of hexafluoropropylene and tetrafluoroethylene (sold by E. I. du Pont under the trade name Teflon 120 FEP Emulsion, containing 55.4% solids) in acetone, and painted on the fabric over a vacuum funnel. After rinsing with an aqueous KOH solution to settle the wet proofing fluorocarbon, the fabric was washed with water and dried. The same procedure was repeated three more times with an aqueous polytetrafluoroethylene emulsion (sold under the trade name FEP 30 by E. I. du Pont) which was diluted with water. After washing with acetone and drying, 8.0 mg. of wet proofing polymer were taken up per sq. cm. of cloth surface area (280 mg./cu. cm. cloth). The impregnated fabric was prepressed at 2000 lb. at 100° C. and was then pressed onto the electrode at the same load at 85° C.

The electrode with the nylon impregnated hydrophobic barrier was used at room temperature as a hydrogen electrode, in conjunction with another air electrode and 30 weight percent KOH electrolyte. The hydrogen gas diffusion electrode with the hydrophobic barrier sheet layer showed no signs of electrolyte seepage through the barrier layer to the gas side in the course of four weeks of operation of the cell.

I claim:

1. In a gas diffusion electrode for sustaining an electrode reaction of a gas fed into the electrode with an electrolyte permeating the opposite side of the electrode, the electrode comprising a coherent porous body having a gas entrance side and an electrolyte-contacting side and containing an electrical conductor; the porous body consisting essentially of particles of a conducting material inert to the electrolyte and of a resinous binder inert to the electrolyte and including a catalyst; the improvement comprising a separate hydrophobic barrier layer being bonded to the gas entrance side of the porous electrode body to form an outer layer on the gas entrance side comprising a closely woven cloth material impregnated with about 30 to 500 mg. of hydrophobic polymer per cu. cm. of cloth material, said polymer being in bonded particulate form, between the particle size range of about 0.05 to 10 microns.

2. The electrode of claim 1 wherein the porous body contains a porous metallic sheet electrical conductor and consists of a backing layer and a gas entrance layer; the backing layer and the gas entrance layer being bonded together and to opposite sides of the electrical conductor, each comprising particles of a conducting material inert to the electrolyte and of a serinous binder inert to the electrolyte, the gas entrance layer including a catalyst, wherein the hydrophobic barrier layer is bonded to the gas entrance layer.

3. The electrode of claim 1 wherein the conducting material particles are metal particles selected from the group consisting of at least one of the metals of platinum, iridium, ruthenium, rhodium, palladium, gold and silver.

4. The electrode of claim 2 wherein the hydrophobic polymer in the hydrophobic barrier layer is selected from the group consisting of polymers and copolymers of fluorinated hydrocarbons, chloro-fluorinated hydrocarbons, ethylene, propylene and mixtures thereof, and the catalyst in the gas entrance layer is selected from the group consisting of at least one of the metals of platinum, iridium, ruthenium, rhodium, palladium, gold and silver.

5. The electrode of claim 4 wherein the conducting material particles are carbonaceous particles selected from the group consisting of carbon, graphite, boron carbide and mixtures thereof, and the resinous binder in the gas entrance layer varies from about 10 to 50 weight percent of the composition of the gas entrance layer.

6. An electrochemical cell comprising a gas diffusion electrode disposed between an electrolyte chamber and a gas chamber, the electrode comprising a coherent porous body having a gas entrance side and an electrolyte-contacting side and containing an electrical conductor; a porous body consisting essentially of particles of a conducting material inert to the electrolyte and of a resinous binder inert to the electrolyte and including a catalyst; the improvement comprising a separate hydrophobic barrier layer being bonded to the gas entrance side of the porous electrode body to form an outer layer on the gas entrance side comprising a closely woven cloth material impregnated with about 30 to 500 mg. of hydrophobic polymer per cu. cm. of cloth material, said polymer being in bonded particulate form, between the particle size range of about 0.05 to 10 microns.

7. The electrochemical cell of claim 6 wherein the porous metallic sheet body of the gas diffusion electrode contains a porous electrical conductor and consists of a backing layer and a gas entrance layer; the backing layer and the gas entrance layer being bonded together and to opposite sides of the electrical conductor, each comprising particles of a conducting material inert to the electrolyte and of a resinous binder inert to the electrolyte, the gas entrance layer including a catalyst, wherein the hydrophobic barrier layer is bonded to the gas entrance layer.

8. The electrochemical cell of claim 6 wherein the conducting material particles of the porous body of the gas diffusion electrode are metal particles selected from the group consisting at least one of the metals of platinum, iridium, ruthenium, rhodium, palladium, gold and silver.

9. The electrochemical cell of claim 7 wherein the hydrophobic polymer in the hydrophobic barrier layer of the gas diffusion electrode is selected from the group consisting of polymers and copolymers of fluorinated hydrocarbons, chlorofluorinated hydrocarbons, ethylene, propylene, and mixtures thereof, and the catalyst in the gas entrance layer is selected from the group consisting of at least one of the metals of platinum, iridium, ruthenium, rhodium, palladium, gold and silver.

10. The electrochemical cell of claim 9 wherein the conducting material particles of the porous body of the gas diffusion electrode are carbonaceous particles selected from the group consisting of carbon, graphite, boron carbide and mixtures thereof, and the resinous binder in the gas entrance layer varies from about 10 to 50 weight percent of the composition of the gas layer.

References Cited

UNITED STATES PATENTS

| | | | |
|---|---|---|---|
| 3,203,834 | 8/1965 | Breiner | 136—120 |
| 3,385,736 | 5/1968 | Deibert | 136—120 |
| 3,432,355 | 3/1969 | Niedrach et al. | 136—86 |

WINSTON A. DOUGLAS, Primary Examiner

M. J. ANDREWS, Assistant Examiner

U.S. Cl. X.R.

136—120 FC, 121